United States Patent
Ahn (10) Patent No.: US 9,591,522 B2
(45) Date of Patent: Mar. 7, 2017

(54) METHOD AND APPARATUS FOR DETERMINING MESSAGE TRANSMISSION IN MOBILE COMMUNICATION SYSTEM WHEN SIMULTANEOUSLY USING SPS AND DRX

(71) Applicant: Samsung Electronics Co., Ltd., Suwon-si, Gyeonggi-do (KR)

(72) Inventor: Young-Jin Ahn, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 201 days.

(21) Appl. No.: 14/161,010

(22) Filed: Jan. 22, 2014

(65) Prior Publication Data

US 2014/0204870 A1 Jul. 24, 2014

(30) Foreign Application Priority Data

Jan. 24, 2013 (KR) ........................ 10-2013-0007963

(51) Int. Cl.
| | |
|---|---|
| *H04W 28/06* | (2009.01) |
| *H04W 72/12* | (2009.01) |
| *H04W 72/04* | (2009.01) |
| *H04L 5/00* | (2006.01) |
| *H04W 76/04* | (2009.01) |

(52) U.S. Cl.
CPC ........... *H04W 28/06* (2013.01); *H04L 5/0053* (2013.01); *H04W 72/0406* (2013.01); *H04W 72/1263* (2013.01); *H04W 72/1278* (2013.01); *H04W 76/048* (2013.01)

(58) Field of Classification Search
CPC ............. H04W 28/06; H04W 72/0406; H04W 72/1263; H04W 72/1278; H04W 76/048; H04L 5/0053
See application file for complete search history.

(56) References Cited

U.S. PATENT DOCUMENTS

| | | | |
|---|---|---|---|
| 2010/0172313 A1 | 7/2010 | Ho et al. | |
| 2010/0195605 A1* | 8/2010 | Suzuki | H04W 72/042 370/329 |
| 2011/0083066 A1* | 4/2011 | Chung | H03M 13/09 714/807 |
| 2013/0083702 A1* | 4/2013 | Barany | H04W 28/06 370/261 |

* cited by examiner

*Primary Examiner* — Joshua Kading
(74) *Attorney, Agent, or Firm* — Jefferson IP Law, LLP (57) ABSTRACT

A method for message transmission of a base station and message determination of a terminal in a mobile communication system is provided. The method includes, if a condition for operating in a first mode is met, generating a first message instructing to operate in the first mode, transmitting the first message to a terminal, receiving a response message for the first message, and determining whether the terminal has received the first message, wherein the first message transmission is performed within a time period.

20 Claims, 10 Drawing Sheets

METHOD AND APPARATUS FOR DETERMINING MESSAGE TRANSMISSION IN MOBILE COMMUNICATION SYSTEM WHEN SIMULTANEOUSLY USING SPS AND DRX

CROSS-REFERENCE TO RELATED APPLICATION(S)

This application claims the benefit under 35 U.S.C. §119(a) of a Korean patent application filed on Jan. 24, 2013 in the Korean Intellectual Property Office and assigned Serial number 10-2013-0007963, the entire disclosure of which is hereby incorporated by reference.

TECHNICAL FIELD

The present disclosure relates to determining message transmission in a mobile communication system.

BACKGROUND

An efficient communication service has been provided using Quality of Service (QoS) and a Robust Header Compression (RoHC) technique for compressing static fields of a packet header with respect to a packet having a predetermined length and a packet interval (for example, a Voice Over Internet Protocol (VoIP) packet). Also, with respect to a recent communication service such as Long Term Evolution (LTE), in the case where Semi-Persistent Scheduling (SPS) is introduced and a condition under which a packet of a predetermined length may be transmitted with a predetermined interval is established, a predetermined bandwidth is allocated to a terminal with a predetermined interval without transmission of a control signal for informing use information of a radio resource, so that delay in scheduling may be minimized and an amount of a control signal may be reduced. The number of users to whom a service may be provided simultaneously may increase maximally using these techniques. The above-described aspects are techniques for providing an efficient service in a network. However, need for providing an efficient service at a terminal has emerged. A representative example thereof is to increase a usable time of a battery.

For this purpose, a terminal uses a Discontinuous Reception (DRX) technique of deactivating a Radio Frequency (RF) module of the terminal in the case where a transmit or receive packet does not exist, and activating the RF module under only a specific condition. In the case of using the DRX technique, the terminal activates the RF module only at a point at which an On-Duration timer, an Inactivity timer, and a Re-transmission timer operate, or, depending on cases, only at a Scheduling Request (SR) transmission or Random Access (RA) response reception point or a point where transmission or reception information exists. However, applying DRX and SPS simultaneously when the terminal transmits a packet having a characteristic of a predetermined length and a transmission interval has the following problem in an aspect of each technique.

Figure 1:
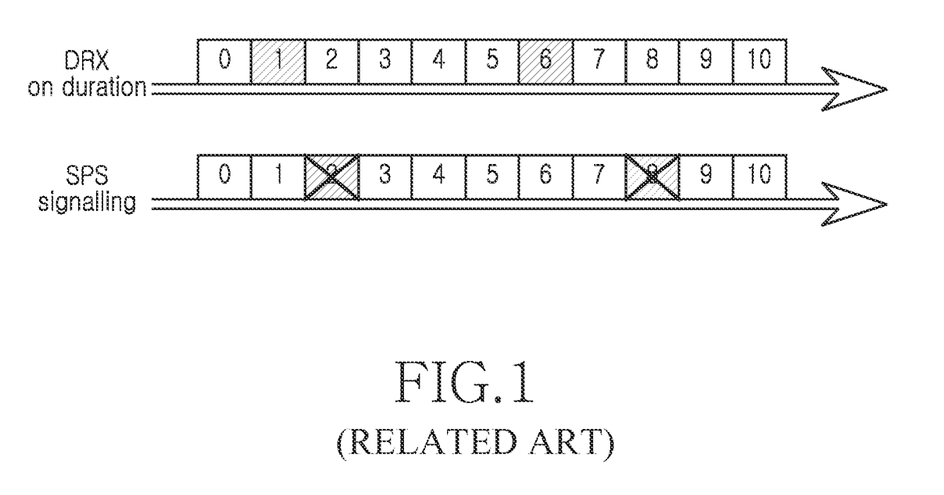
FIG. 1 is a view illustrating a problem when DRX and SPS are simultaneously applied according to the related art.

FIG. 1 is a view illustrating a problem when DRX and SPS are simultaneously applied according to the related art.

Referring to FIG. 1, a terminal to which DRX has been applied cannot receive any signal from a base station except a DRX ON section (RF ON section). However, a signal informing activation and deactivation of an SPS function may exist except a relevant DRX ON section. In this case, the terminal has a problem of not receiving the signal.

To resolve this problem, it is possible to perform scheduling so that an SPS signal may be transmitted during only a DRX ON section having a periodic interval, but in this case, since a point where scheduling is possible is limited to one tenth at the minimum, flexibility in scheduling reduces and effective utilization of a radio resource is difficult.

Accordingly there is a need for a method and an apparatus for transferring and determining message transmission for an SPS operation in case of using an SPS technique and a DRX technique simultaneously in a mobile communication system The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for transferring and determining a message in a mobile communication system.

Another aspect of the present disclosure is to provide a method and an apparatus for transferring and determining message transmission for an SPS operation in case of using an SPS technique and a DRX technique simultaneously in a mobile communication system.

Another aspect of the present disclosure is to provide a method and an apparatus for transmitting a signal using an Robust Header Compression (ROHC) message when transferring and generating a signal for an SPS operation in case of using an SPS technique and a DRX technique simultaneously in a mobile communication system.

Another aspect of the present disclosure is to provide a method and an apparatus for determining whether a terminal normally receives a message transmitted by a base station in case of using an SPS technique and a DRX technique simultaneously in a mobile communication system.

In accordance with an aspect of the present disclosure, a method for determining a transmission message of a base station in a mobile communication system is provided. The method includes, if a condition for operating in a first mode is met, generating a first message instructing to operate in the first mode, transmitting the first message to a terminal, receiving a response message for the first message, and determining whether the terminal has received the first message, wherein the first message transmission is performed within a time period.

In accordance with another aspect of the present disclosure, a method for determining a reception message of a terminal in a mobile communication system is provided. The method includes receiving a first message from a base station and analyzing the same, generating a response message for the first message according to the analysis result, and transmitting the response message to the base station, wherein the first message reception is performed within a time period.

In accordance with another aspect of the present disclosure, an apparatus of a base station, for determining a transmission message in a mobile communication system is provided. The apparatus includes a packet processor for, if a condition for operating in a first mode is met, generating a first message instructing to operate in the first mode, and a modem for determining whether the condition for operating in the first mode is met, transmitting the first message to a terminal, and receiving a response message for the first message, wherein the packet processor determines whether the terminal has received the first message, and the first message transmission is performed within a time period.

In accordance with another aspect of the present disclosure, an apparatus of a terminal, for determining a reception message in a mobile communication system is provided. The apparatus includes a modem for receiving a first message from a base station and analyzing the same, and a packet processor for generating a response message for the first message according to the analysis result, wherein the modem transmits the response message to the base station, and the first message reception is performed within a time period.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a method and an apparatus for determining message transmission in a mobile communication system are described.

Figure 2:
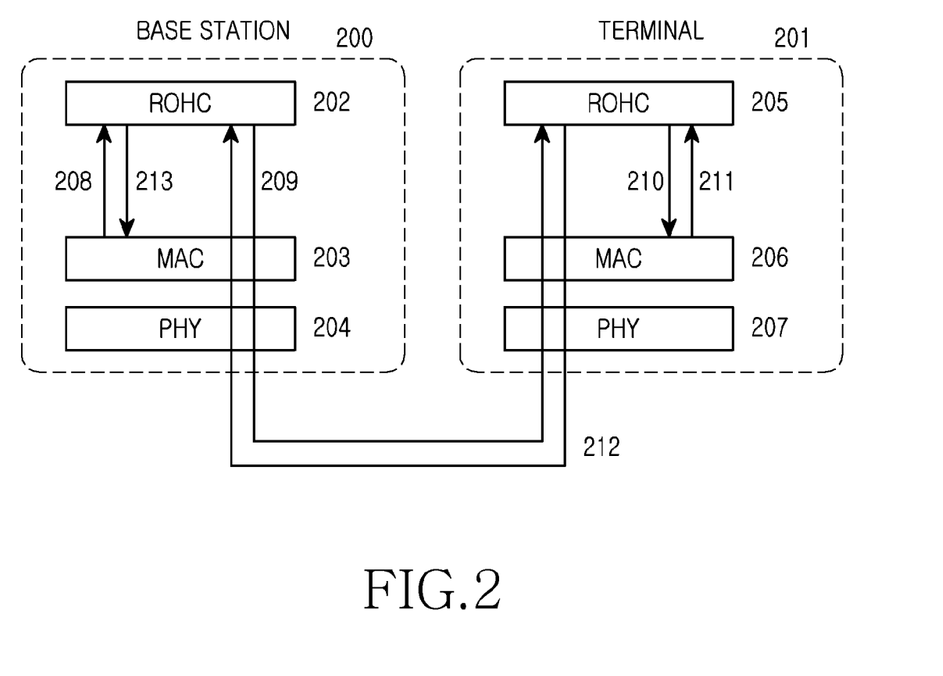
FIG. 2 is a view illustrating a structure of a protocol stack of a base station and a terminal according to an embodiment of the present disclosure.

FIG. 2 is a view illustrating a structure of a protocol stack of a base station and a terminal according to an embodiment of the present disclosure.

Referring to FIG. 2, the base station 200 and the terminal 201 include Robust Header Compression (ROHC) layers 202, 205, Medium Access Control layers 203, 206, and physical (PHY) layers 204, 207, respectively. The ROHC layers 202, 205 may communicate (209,212) and may be included in an Internet Protocol (IP) layer.

In the case where a field that is repetitive or may be inferred via another field value or has similarity in a degree of increasing or decreasing between packets exists among IP packet fields, the ROHC layers 202, 205 may perform a function of omitting all or a portion of the relevant field or encoding the relevant field in a shorter length than the original length to reduce an entire header length. According to an embodiment of the present disclosure, the ROHC layers 202, 205 perform a function of generating and analyzing a feedback type packet for SPS related information transmission (213, 210) and/or reception (208, 211) to and/or from the Medium Access Control (MAC) layers 203, 206.

In addition to the existing unique function of the MAC layer, the MAC layers 203, 206 perform Dynamic Scheduling (DS) and Semi-Persistent Scheduling (SPS) functions.

The MAC layer 203 of the base station 200 makes a determination to apply or release SPS, and transmits relevant information to the MAC layer 206 of the terminal 201 to synchronize a scheduler operation between the base station 200 and the terminal 201.

In the description below, a packet and a message are used interchangeably.

Figure 10:
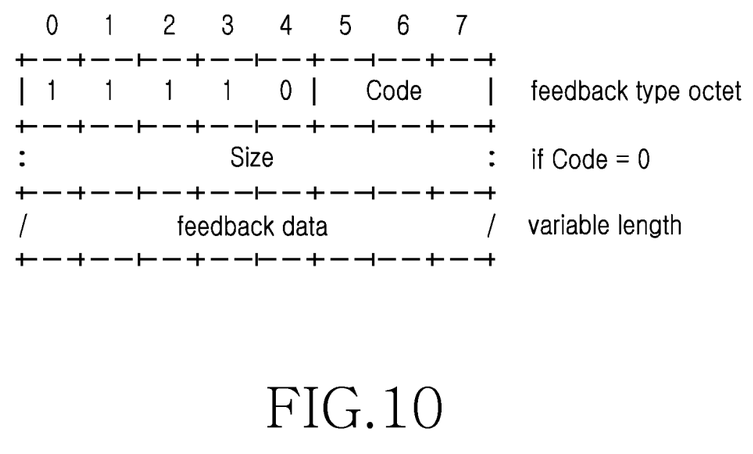
FIG. 10 is a view illustrating a format of a feedback type packet according to an embodiment of the present disclosure.

An ROHC feedback type packet may be used between the base station 200 and the terminal 201 as an independent packet as illustrated in FIG. 10. For the kind of ROHC feedback type packet, a feedback type 1 and a feedback type 2 have been defined conventionally.

The feedback type 1 is an ACK, meaning an ROHC packet that has been normally received, and the feedback of type 2 is used in case of informing whether reception of the packet is normal using ACK/NACK. Since information for activation and deactivation of an SPS function may be transmitted from the base station 200 to the terminal 201 according to the present disclosure, definition of the following field is required.

First, an SPS activation and deactivation field (one bit (0: deactivation, 1: activation)) may be defined, an uplink or downlink division field (one bit (0: downlink, 1: uplink)) may be defined, and an SPS start system frame field (010239) (14 bits) may be defined.

Also, as feedback information for informing the base station of whether the terminal 201 has normally received a relevant packet, definition of the following field may be required.

First, an SPS-applied packet reception inform field (one bit (1: normal reception, 0: abnormal reception)) may be defined, an SPS release packet reception inform field (one bit (1: normal reception, 0: abnormal reception)) may be defined, and an uplink/downlink division field (one bit (0: downlink, 1: uplink)) may be defined.

The present disclosure defines a new ROHC feedback packet including the above-described fields as a type 3 as shown in Table 1 and Table 2.

TABLE 1

Configuration of ROHC feedback type 3 packet for downlink (base station to mobile station)

| Byte | Field name | Description |
| --- | --- | --- |
| 1st | 11101-code | 11101: RoHC Feedback type 3 code("010"): The size of the feedback data field in octets |
| 2nd | sps-dir-sysfrm | sps(1bit): SPS Setup('1'), Release('0') dir(1bit): Downlink('0'), Uplink('1') sysfrm_msb(6bit): MSB of system frame number including sub-frame |
| 3rd | sysfrm | sysfrm_lsb(8bit): LSB of system frame number including sub-frame |

A first byte of an ROHC feedback type 3 packet is Most Significant Bit (MSB) five bits corresponding to "11101" and discriminates a relevant packet from other ROHC packets and feedback type packets. Since a "code" field means the number of bytes corresponding to a data portion of a feedback packet, the "code" field becomes 2 for a case of a feedback packet included in a downlink, and becomes 1 for a case of an uplink.

In case of a feedback transmitted to a downlink, a second byte of the ROHC feedback type 3 packet consists of an "sps" bit which is an SPS apply or release information, a "dir" bit which is information regarding whether a link to which an SPS is applied is an uplink or a downlink, and bits 13~8 corresponding to an MSB among a 14-bit "sysform" field informing a system frame number and a subframe number of an SPS start point. A third byte of the ROHC feedback type 3 packet consists of the other bits 7~0 of the "sysform" field.

TABLE 2

Configuration of ROHC feedback type 3 packet for uplink (mobile station to base station)

| Byte | Field name | Description |
| --- | --- | --- |
| 1st | 11101-code | 11101: RoHC Feedback type 3 code("001"): The size of the feedback data field in octets |

TABLE 2-continued

Configuration of ROHC feedback type 3 packet for uplink (mobile station to base station)

| Byte | Field name | Description |
| --- | --- | --- |
| 2nd | 000-setack-relack-dir | setack(2bit): SPS Setup ACK("11"), NACK("10"), N/A("00") relack(2bit): SPS Release ACK("11"), NACK("10"), N/A("00") dir(1bit): Downlink('0'), Uplink('1') |

A first byte of an ROHC feedback type 3 packet is MSB five bits corresponding to "11101" and discriminates a relevant packet from other ROHC packets and feedback type packets. Since a "code" field means the number of bytes corresponding to a data portion of a feedback packet, the "code" field becomes 2 for a case of a feedback packet included in a downlink, and becomes 1 for a case of an uplink.

In the case of a feedback transmitted to an uplink, a second byte of the ROHC feedback type 3 packet consists of a "setack" field representing whether an SPS-applied packet has been received from the base station, a "relack" field representing whether an SPS release packet has been received, and a "dir" bit which is information regarding whether a link to which an SPS is applied is an uplink or a downlink. In Table 2, "NACK" is used in the case where an error exists in an ROHC feedback type 3 packet received by the terminal, or a system frame number and a sub frame number of an SPS apply or release point do not coincide with a DRX ON section of the terminal "N/A" represents not applicable.

The present disclosure includes a first operation of transmitting, at a base station, an SPS packet to a terminal using an ROHC feedback type 3 packet, and a second operation of informing the base station of whether the terminal has received an SPS apply or release via an ROHC feedback type 3 packet.

Figure 3:
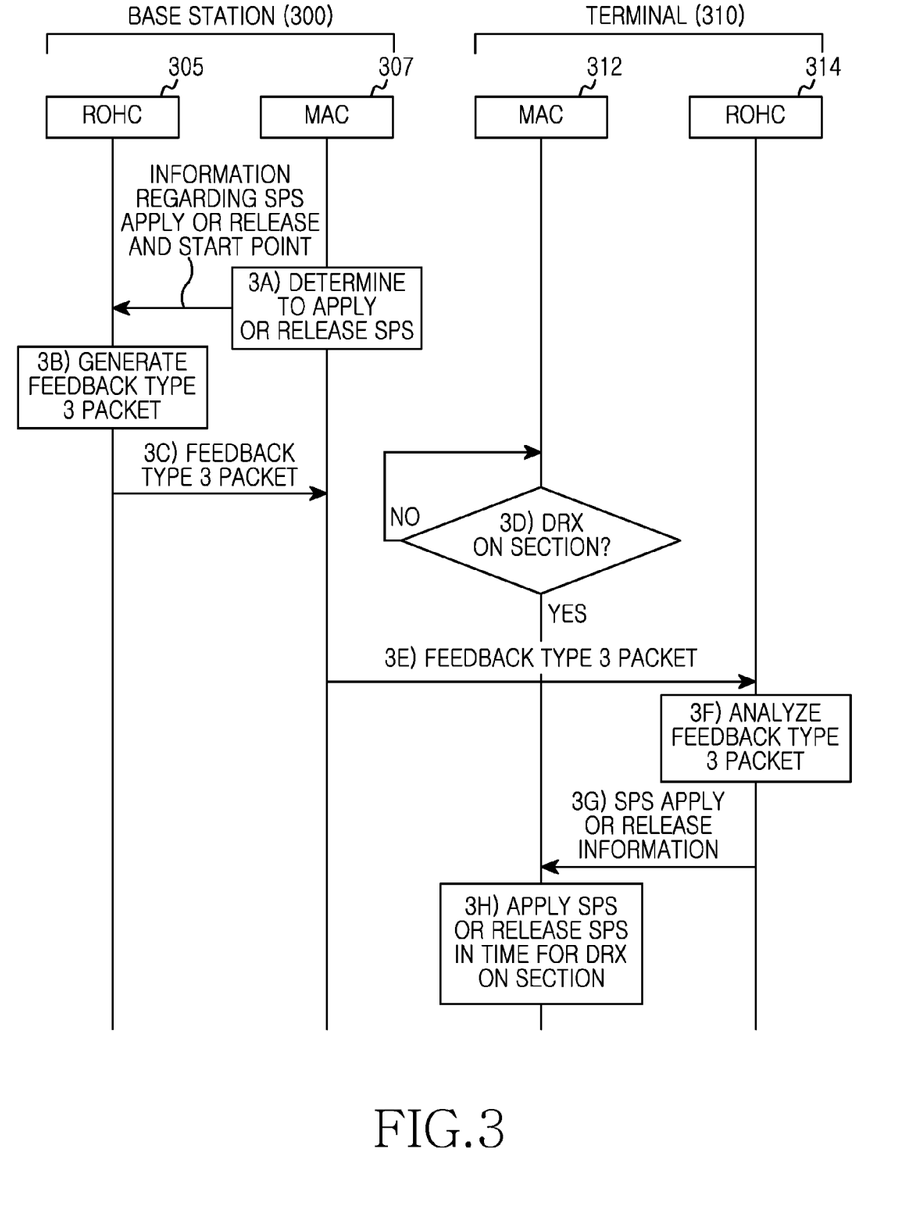
FIG. 3 is a view of a message flow illustrating a process for transmitting, at a base station, a feedback type 3 packet to a terminal according to an embodiment of the present disclosure.

FIG. 3 is a view of a message flow illustrating a process for transmitting, at a base station, a feedback type 3 packet to a terminal according to an embodiment of the present disclosure.

Referring to FIG. 3, in the case where an MAC layer 307 of a base station 300 determines a characteristic of traffic and requires application of an SPS or release of the SPS. At operation 3A, the MAC layer 307 may transfer information representing the application or release of the SPS and information regarding a start point of the application or release of the SPS to an ROHC layer 305. For reference, determining the SPS application or SPS release of the base station 300 may be performed by the conventional method of determining the SPS application or SPS release of the base station.

The ROHC layer 305 may generate an ROHC feedback type 3 packet based on information provided by the MAC layer 307 at operation 3B, and transfer the same to the MAC layer 307 performing a DRX function of the base station 300 at operation 3C. The MAC layer 307 may transmit the feedback type 3 packet to the terminal 310.

The ROHC layer 305 may set whether to apply/release SPS, set an uplink/downlink for an apply/release link, and set the position of a start frame and/or a subframe to generate the ROHC feedback type 3 packet.

The feedback type 3 packet may be transferred to an MAC layer 312 of the terminal 310 during a DRX ON section at operation 3Dd, and the MAC layer 312 transfers the feedback type 3 packet to an ROHC layer 314 at operation 3E.

The ROHC layer 314 may analyze the feedback type 3 packet at operation 3F and transfer information regarding application or release of the SPS and a start point of the base station to the MAC layer 312 at operation 3G.

The MAC layer 312 may perform SPS application in time for a DRX ON section using relevant information at operation 3H.

In the case where the characteristic of user traffic does not allow SPS application, the MAC layer 307 of the base station 300 may determine an SPS release, and transfer SPS release information having the meaning of switching the SPS to dynamic scheduling and time point information of the switching the SPS to dynamic scheduling to the ROHC layer 314 of the terminal. The relevant information may be transferred to the MAC layer 312 of the terminal 310 via the same path, so that the SPS release operation is performed.

Figure 4:
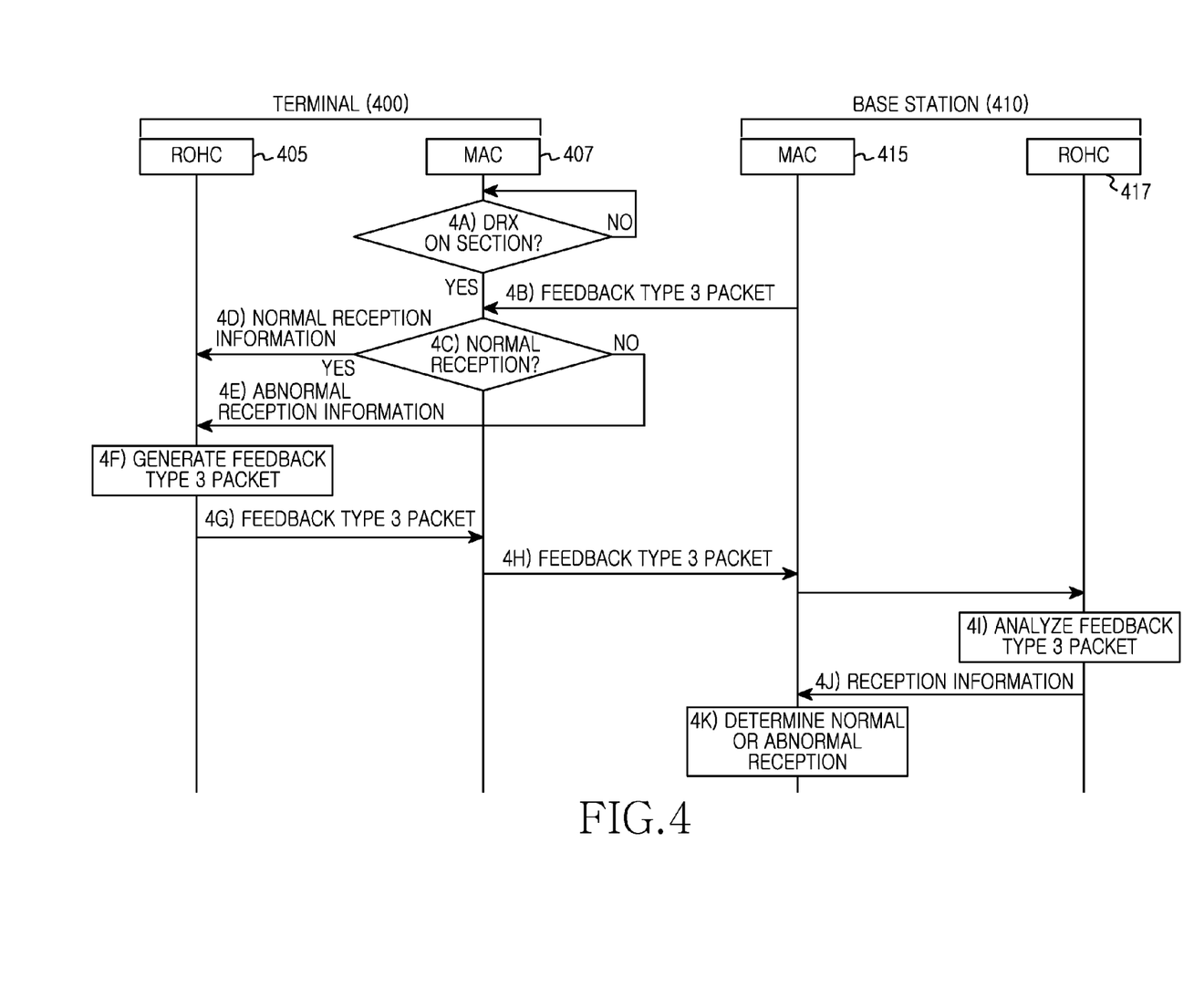
FIG. 4 is a view of a message flow illustrating a process for informing a base station of whether a terminal has received a feedback type 3 packet according to an embodiment of the present disclosure.

FIG. 4 is a view of a message flow illustrating a process for informing a base station of whether a terminal has received a feedback type 3 packet according to an embodiment of the present disclosure.

Referring to FIG. 4, a MAC layer 407 of a terminal 400 receives at operation 4B a feedback type 3 packet transmitted by an MAC layer 415 of a base station 410 in time for a DRX ON section at operation 4Aa. The MAC layer 407 may determine whether a feedback type 3 packet is normally received at operation 4C, and transfer information of whether the feedback type 3 packet is normally received to an ROHC layer 405 of the terminal 400 at operations 4D and 4E.

In case of normal reception, the MAC layer 407 may transfer normal reception information to the ROHC layer 405 at operation 4D. In case of abnormal reception, the MAC layer 407 transfers abnormal reception information to the ROHC layer 405 at operation 4E.

The ROHC layer 405 may generate a feedback type 3 packet including whether a packet received from the base station is normally received or abnormally received based on the normal reception information or the abnormal reception information at operation 4F, and transfer the relevant packet to the MAC layer 407 at operation 4G.

The ROHC layer 405 may set information representing whether a packet transmitted by the base station has been normally received or abnormally received. The ROHC layer 405 may set information representing normal/abnormal reception of a packet indicating SPS application, and information representing normal/abnormal reception of a packet indicating SPS release using a feedback type 3 packet. When applying SPS, "N/A" is used for a value of a "relack" field. When releasing SPS, "N/A" is used for a value of a "setack" field. Additionally, the ROHC layer 405 may set whether a link representing SPS apply/release is an uplink or a downlink to generate a feedback type 3 packet.

The MAC layer 407 may transmit the feedback type 3 packet to the base station 410 at operation 4H. The feedback type 3 packet may be transferred to the ROHC layer 417 by way of the MAC layer 415 of the base station 410.

The ROHC layer 417 may analyze the received feedback type 3 packet at operation 4I, obtain information regarding reception success or reception failure from the feedback type 3 packet to determine reception success or reception failure and transfers the same to the MAC layer 415 at operation 4J. The MAC layer 415 determines whether the terminal 400 has normally received the feedback type 3 packet based on the reception information at operation 4K.

Figure 5:
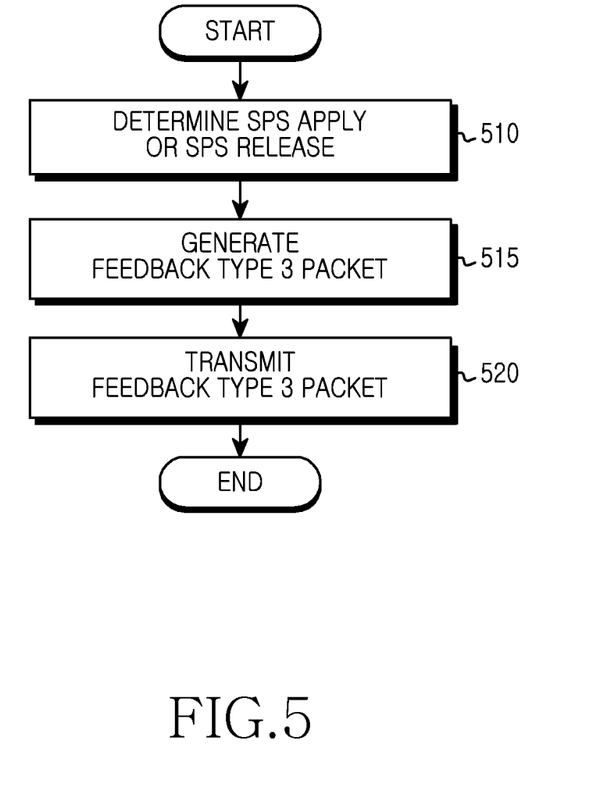
FIG. 5 is a flowchart illustrating an operation of a base station in the case where the base station transmits a feedback type 3 packet to a terminal according to an embodiment of the present disclosure.

FIG. 5 is a flowchart illustrating an operation of a base station in the case where the base station transmits a feedback type 3 packet to a terminal according to an embodiment of the present disclosure.

Referring to FIG. 5, in the case where the base station determines a characteristic of user traffic requires SPS application or SPS release at operation 510, the base station generates a feedback type 3 packet including information representing application or release of the SPS and information regarding a start point of the application or release of the SPS at operation 515. For a reference for determining the SPS application or SPS release of the base station, the conventional determining method may be used.

The base station may transmit the feedback type 3 packet to the terminal at operation 520.

Figure 6:
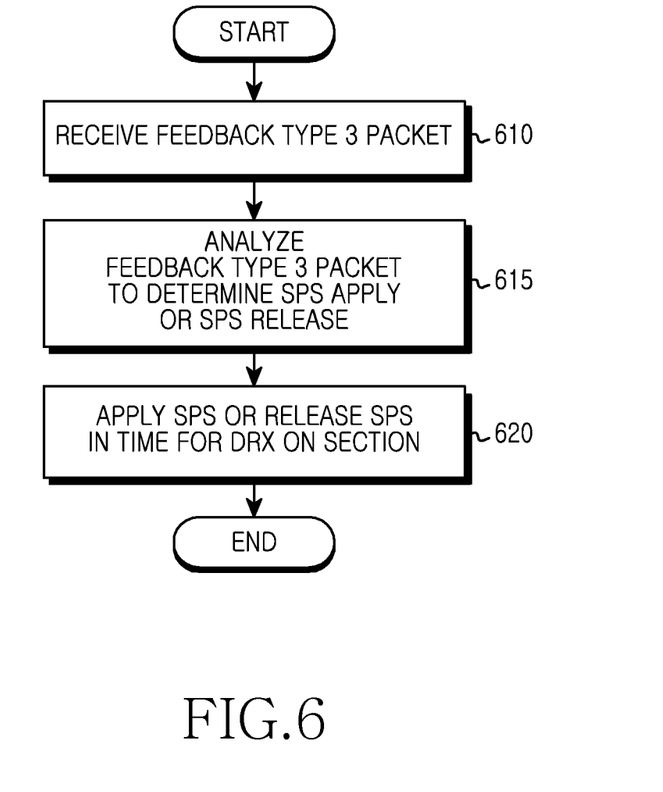
FIG. 6 is a flowchart illustrating an operation of a terminal in the case where a base station transmits a feedback type 3 packet to the terminal according to an embodiment of the present disclosure.

FIG. 6 is a flowchart illustrating an operation of a terminal in the case where a base station transmits a feedback type 3 packet to the terminal according to an embodiment of the present disclosure.

Referring to FIG. 6, the terminal may receive a feedback type 3 packet transmitted by the base station during a DRX ON section at operation 610. The terminal may analyze the feedback type 3 packet to determine SPS application or release of the base station at operation 615. The feedback type 3 packet includes start point information regarding SPS application or release.

The terminal may apply SPS in time for a DRX ON section or performs SPS release using relevant information at operation 620.

Figure 7:
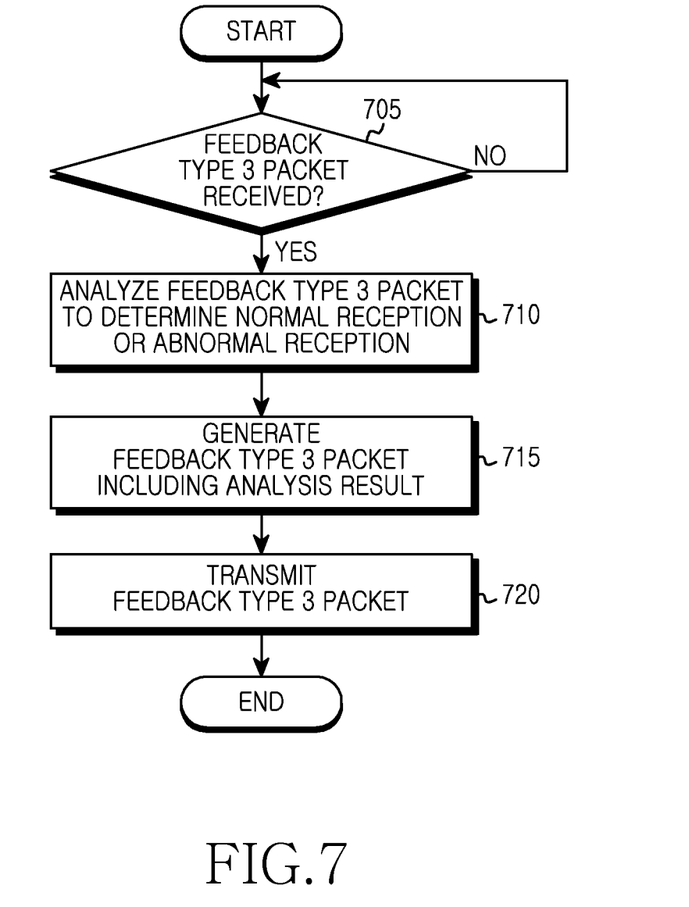
FIG. 7 is a flowchart illustrating an operation process of a terminal in a process for informing a base station of whether the terminal has received a feedback type 3 packet according to an embodiment of the present disclosure.

FIG. 7 is a flowchart illustrating an operation process of a terminal in a process for informing a base station of whether the terminal has received a feedback type 3 packet according to an embodiment of the present disclosure.

Referring to FIG. 7, when receiving a feedback type 3 packet at operation 705, the terminal analyzes the feedback type 3 packet to determine whether the feedback type 3 packet is a normal reception or abnormal reception at operation 710.

The terminal may generate a feedback type 3 packet including an analysis result regarding normal reception or abnormal reception at operation 715, and transmit the generated feedback type 3 packet to the base station at operation 720.

Figure 8:
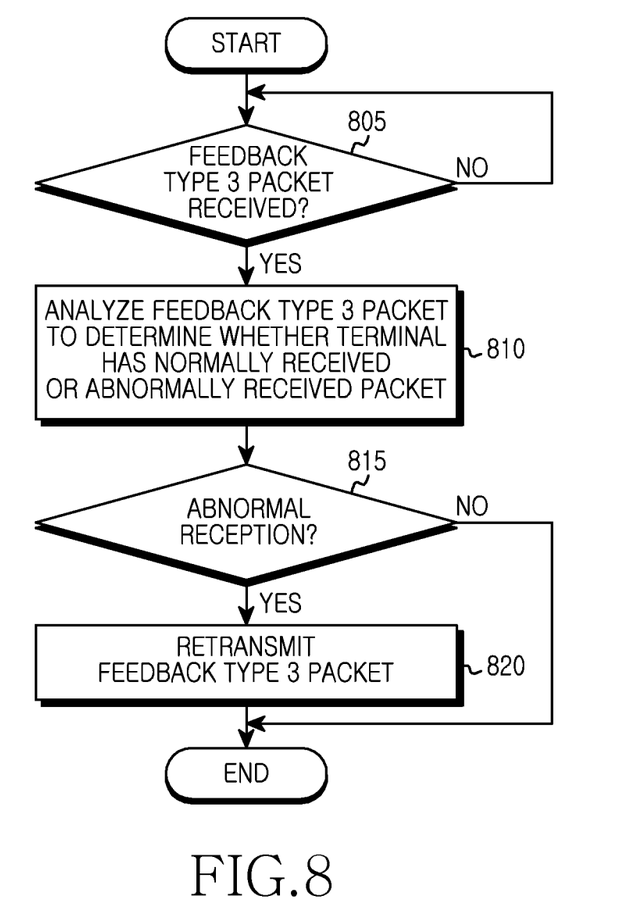
FIG. 8 is a flowchart illustrating an operation process of a base station in a process for informing the base station of whether a terminal has received a feedback type 3 packet according to an embodiment of the present disclosure.

FIG. 8 is a flowchart illustrating an operation process of a base station in a process for informing the base station of whether a terminal has received a feedback type 3 packet according to an embodiment of the present disclosure.

Referring to FIG. 8, the base station may receive a feedback type 3 packet transmitted by the terminal at operation 805. The base station may analyze the feedback type 3 packet to determine whether the terminal has normally received or abnormally received the feedback type 3 packet transmitted to the terminal by the base station at operation 810.

In the case where the terminal has abnormally received the feedback type 3 packet at operation 815, the base station may retransmit the feedback type 3 packet transmitted to the terminal at operation 820.

Figure 9:
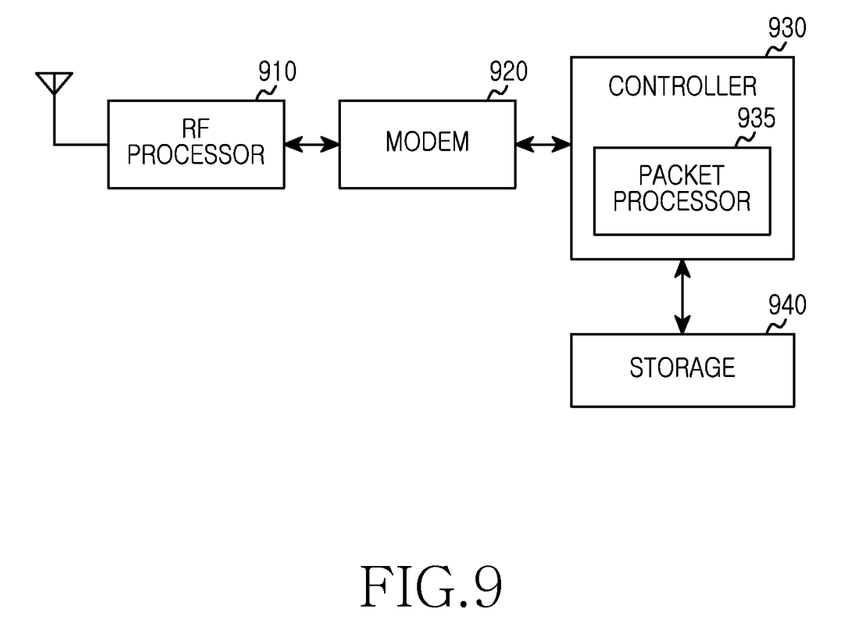
FIG. 9 is a block diagram illustrating a base station and a terminal according to an embodiment of the present disclosure.

FIG. 9 is a block diagram illustrating a base station and a terminal according to an embodiment of the present disclosure.

Referring to FIG. 9, the base station or the terminal may include a Radio Frequency (RF) processor 910, a modem 920, a controller 930, and a storage 940.

The RF processor 910 may perform a function for transmitting and receiving a signal via a radio channel such as band conversion, amplification, etc. . . . of a signal. That is, the RF processor 910 may up-convert a baseband signal provided from the modem 920 to an RF band signal, and transmit the same via an antenna, and down-convert an RF band signal received via the antenna to a baseband signal. For example, the RF processor 910 may include an amplifier, a mixer, an oscillator, a Digital to Analog Converter (DAC), an Analog to Digital Converter (ADC), etc. . . . . . In FIG. 9, though only one antenna has been illustrated, the base station may have a plurality of antennas.

The modem 920 may perform a conversion function between a baseband signal and a bit string according to a physical layer standard of the system. For example, according to an Orthogonal Frequency Division Multiplexing (OFDM) scheme, during data transmission, the modem 920 may generate complex symbols by encoding and modulating a transmission bit string, map the complex symbols to subcarriers, and configure OFDM symbols via an Inverse Fast Fourier Transform (IFFT) operation and Cyclic Prefix (CP) insertion. Also, during data reception, the modem 920 may divide a baseband signal provided from the RF processor 910 on an OFDM symbol basis, recover signals mapped to subcarriers via a Fast Fourier Transform (FFT) operation, and recover a bit string via demodulation and decoding. Particularly, according to the present disclosure, the modem 920 may perform an operation of an MAC layer of the base station or the terminal of the present disclosure.

The controller 930 may control an overall operation of the base station or the terminal. For example, the controller 930 controls transmission and reception of a signal via the modem 920 and the RF processor 910. The controller 930 may include at least one processor.

Also, the controller 930 may include a packet processor 935. According to the present disclosure, the packet processor 935 may include an ROHC layer of the base station or the terminal.

The storage 940 may perform a function for storing a program for controlling an overall operation of the base station or the terminal, and temporary data occurring during execution of a program. Particularly, according to the present disclosure, the storage 940 may store a generated or received feedback type 3 packet.

An operation of the base station in the case where the base station transmits a feedback type 3 packet to the terminal is described below.

When determining a characteristic of traffic requires SPS application or SPS release, the modem 920 of the base station may transfer information representing application or release of SPS and information regarding a start point to the packet processor 935. For reference, determining the SPS application or SPS release of the packet processor 935 may be performed by the conventional determining method.

The packet processor 935 may generate an ROHC feedback type 3 packet based on information provided from the modem 920, and transfer the same to the modem 920 performing a DRX function of the base station. The modem 920 may transmit the feedback type 3 packet to the terminal.

In the case where the characteristic of user traffic does not allow SPS application, the modem 920 of the base station may determine an SPS release, and transfer SPS release information having the meaning of switching the SPS scheduling to dynamic scheduling and time point information of the switching the SPS scheduling to dynamic scheduling to the packet processor 935 of the terminal. The relevant information is transferred to the terminal.

An operation of the terminal in the case where the base station transmits a feedback type 3 packet to the terminal is described below.

The feedback type 3 packet may be transferred to the modem 920 of the terminal during a DRX ON section, and the modem 920 may transfer the feedback type 3 packet to the packet processor 935.

The packet processor 935 may analyze the feedback type 3 packet and transfer information regarding SPS application or release and a start point of the base station to the modem 920. The modem 920 may perform SPS application on a DRX ON section using the relevant information.

An operation of the terminal in case of informing the base station of whether the terminal has received a feedback type 3 packet is described below.

The modem 920 of the terminal may receive a feedback type 3 packet transmitted by the base station during a DRX ON section. The modem 920 may determine whether the feedback type 3 packet has been normally received, and transfer information of whether the feedback type 3 packet has been normally received to the packet processor 935 of the terminal. In case of normal reception, the modem 920 may transfer normal reception information to the packet processor 935. In case of abnormal reception, the modem 920 may transfer abnormal reception information to the packet processor 935.

The packet processor 935 may generate a feedback type 3 packet including whether the feedback type 3 packet is a normal reception or abnormal reception based on the relevant information, and transfer the relevant packet to the modem 920. The modem 920 may transmit the feedback type 3 packet to the base station.

An operation of the base station in case of informing the base station of whether the terminal has received a feedback type 3 packet is described below.

The feedback type 3 packet may be transferred to the packet processor 935 by way of the modem 920 of the base station. The packet processor 935 may analyze the received feedback type 3 packet, determine reception success or reception failure, and transfer the relevant information to the modem 920. The modem 920 may determine whether the terminal has normally received the feedback type 3 packet based on the reception information.

Methods according to the various embodiments described in claims and/or the specification of the present disclosure may be implemented in the form of a hardware, a software, or a combination of the hardware and the software.

In case of implementation in the form of a software, a computer readable storage medium for storing one or more programs (software modules) may be provided. One or more programs stored in the computer readable storage medium are configured for execution by one or more processors inside the electronic device. One or more programs may include instructions for enabling the electronic device to execute the methods according to the various embodiments described in claims and/or the specification of the present disclosure.

This program (a software module, a software) may be stored in Random Access Memory (RAM), a non-volatile memory including a flash memory, Read Only Memory (ROM), an Electrically Erasable Programmable Read Only Memory (EEPROM), a magnetic disc storage device, a Compact Disc (CD)-ROM, Digital Versatile Discs (DVDs), or other types of optical storage devices, and a magnetic cassette. Alternatively, the program may be stored in a memory configured by a portion or all of these. Also, a plurality of respective constituent memories may be provided.

Also, the program may be stored in an attachable storage accessible via a communication network such as the Internet, an Intranet, a Local Area Network (LAN), Wide LAN (WLAN), or SAN, or a communication network configured in a combination of these. The storage may access a device performing the various embodiments of the present disclosure via an external port.

The present disclosure may resolve a user message reception error occur problem due to a transfer failure of an SPS message and absence of feedback regarding reception determination when SPS and DRX techniques are simultaneously used, so that a radio resource may be efficiently used and power consumption of a terminal may be reduced.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating a base station in a mobile communication system, the method comprising:
    generating a robust header compression (ROHC) packet including type information indicating that information regarding semi-persistent scheduling (SPS) is included; and
    transmitting, to a terminal, the ROHC packet,
    wherein the ROHC packet comprises first information indicating whether to apply or release SPS, second information regarding an SPS start point, and third information indicating a link to which the SPS is applied is uplink or downlink.

2. The method of claim 1, wherein the ROHC packet is transmitted within a discontinuous reception (DRX) ON duration for the terminal.

3. The method of claim 1, further comprising:
    receiving, from the terminal, another ROHC packet in response to the ROHC packet; and
    determining whether the terminal has received the ROHC packet or not, by using the another ROHC packet.

4. The method of claim 3, wherein the another ROHC packet comprises at least one of information representing that the another ROHC packet corresponds to a third type of ROHC feedback, information representing a size of the another ROHC packet, information representing that the terminal receives information for applying SPS from the base station or an error exists in the ROHC packet or the ROHC packet is not applicable to the application of the SPS, information representing that the terminal receives information for releasing SPS from the base station or an error exists in the ROHC packet or the ROHC packet is not applicable to the release of the SPS, and information representing whether a link to which the SPS is applied is an uplink or a downlink.

5. The method of claim 1, wherein the ROHC packet further comprises at least one of information that the ROHC packet corresponds to a third type of feedback and information representing a size of the ROHC packet.

6. A method for operating a terminal in a mobile communication system, the method comprising:
    receiving, from the base station, a robust header compression (ROHC) packet including type information indicating that information regarding semi-persistent scheduling (SPS) is included; and
    performing application or release of SPS based on the ROHC packet,
    wherein the ROHC packet comprises first information indicating whether to apply or release the SPS, second information regarding an SPS start point, and third information indicating a link to which the SPS is applied is uplink or downlink.

7. The method of claim 6, further comprising:
    generating another ROHC packet in response to the ROHC packet; and
    transmitting the another ROHC packet to the base station.

8. The method of claim 7, wherein the another ROHC packet comprises at least one of information representing that the another ROHC packet corresponds to a third type of ROHC feedback, information representing a size of the another ROHC packet, information representing that the terminal receives information for applying SPS from the base station or an error exists in the ROHC packet or the ROHC packet is not applicable to the application of the SPS, information representing that the terminal receives information for releasing SPS from the base station or an error exists in the ROHC packet or the ROHC packet is not applicable to the release of the SPS, and information representing whether a link to which the SPS is applied is an uplink or a downlink.

9. The method of claim 6, wherein the ROHC packet is received within a discontinuous reception (DRX) ON duration for the terminal.

10. The method of claim 6, wherein the ROHC packet further comprises at least one of information representing the ROHC packet corresponds to a third type of ROHC feedback and information representing a size of the ROHC packet.

11. An apparatus of a base station in a mobile communication system, the apparatus comprising:
    a packet processor configured to generate a robust header compression (ROHC) packet including type information indicating that information regarding semi-persistent scheduling (SPS) is included; and
    a modem configured to transmit, to a terminal, the ROHC packet,
    wherein the ROHC packet comprises first information indicating whether to apply or release SPS, second information regarding an SPS start point, and third information indicating a link to which the SPS is applied is uplink or downlink.

12. The apparatus of claim 11, wherein the ROHC packet is transmitted within a discontinuous reception (DRX) ON duration for the terminal.

13. The apparatus of claim 9,
    wherein the modem is further configured to receive, from the terminal, another ROHC packet in response to the ROHC packet, and
    wherein the packet processor is further configured to determine whether the terminal has received the ROHC packet or not, by using the another ROHC packet.

14. The apparatus of claim 13, wherein the another ROHC packet comprises at least one of information representing that the another ROHC packet corresponds to a third type of feedback, information representing a size of the another ROHC packet, information representing that the terminal receives information for applying SPS from the base station or an error exists in the ROHC packet or the ROHC packet is not applicable to the application of the SPS, information representing that the terminal receives information for releasing SPS from the base station or an error exists in the ROHC packet or the ROHC packet is not applicable to the release of the SPS, and information representing whether a link to which the SPS is applied is an uplink or a downlink.

15. The apparatus of claim 11, wherein the ROHC packet further comprises at least one of information representing that the ROHC packet corresponds to a third type of ROHC feedback, information representing a size of the ROHC packet.

16. An apparatus of a terminal in a mobile communication system, the apparatus comprising:
a modem configured to receive, from a base station, a robust header compression (ROHC) packet including type information indicating that information regarding semi-persistent scheduling (SPS) is included; and
at least one processor configured to perform application or release of SPS based on the ROHC packet,
wherein the ROHC packet comprises first information indicating whether to apply or release SPS, second information regarding an SPS start point, and third information indicating a link to which the SPS is applied is uplink or downlink.

17. The apparatus of claim 16, further comprising:
a packet processor configured to generate another ROHC packet in response to the ROHC packet,
wherein the modem is further configured to transmits the another ROHC packet to the base station.

18. The apparatus of claim 17, wherein the ROHC packet is received within a discontinuous reception (DRX) ON duration for the terminal.

19. The apparatus of claim 17, wherein the another ROHC packet comprises at least one of information representing that the another ROHC packet corresponds to a third type of ROHC feedback, information representing a size of the another ROHC packet, information representing that the terminal receives information for applying SPS from the base station or an error exists in the ROHC packet or the ROHC packet is not applicable to the application of the SPS, information representing that the terminal receives information for releasing SPS from the base station or an error exists in the ROHC packet or the ROHC packet is not applicable to the release of the SPS, and information representing whether a link to which the SPS is applied is an uplink or a downlink.

20. The apparatus of claim 16, wherein the ROHC packet further comprises at least one of information representing that the ROHC packet corresponds to a third type of ROHC feedback, information representing a size of the ROHC packet.

* * * * *